US008951678B2

(12) United States Patent
Jeong et al.

(10) Patent No.: US 8,951,678 B2
(45) Date of Patent: Feb. 10, 2015

(54) SOLID ELECTROLYTE, METHOD OF PREPARING THE SAME, AND LITHIUM BATTERY CONTAINING THE SOLID ELECTROLYTE

(75) Inventors: Myung-Hwan Jeong, Yongin-si (KR); Sung-Hwan Moon, Yongin-si (KR); Jae-Hyuk Kim, Yongin-si (KR); Yuri Matulevich, Yongin-si (KR); Hee-Young Chu, Yongin-si (KR); Chang-Ui Jeong, Yongin-si (KR); Jong-Seo Choi, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

(21) Appl. No.: 13/406,496

(22) Filed: Feb. 27, 2012

(65) Prior Publication Data

US 2012/0328958 A1 Dec. 27, 2012

(30) Foreign Application Priority Data

Jun. 22, 2011 (KR) .......................... 10-2011-0060805

(51) Int. Cl.
*H01M 10/056* (2010.01)
*H01M 10/052* (2010.01)
*B82Y 30/00* (2011.01)

(52) U.S. Cl.
CPC .......... *H01M 10/052* (2013.01); *H01M 10/056* (2013.01); *B82Y 30/00* (2013.01); *H01M 2300/0068* (2013.01); *H01M 2300/0094* (2013.01); *Y02E 60/122* (2013.01); *Y02T 10/7011* (2013.01)
USPC .......................................... 429/312; 429/306

(58) Field of Classification Search
USPC ................ 429/312, 306, 310, 313, 314, 317; 977/755, 788
See application file for complete search history.

(56) References Cited

U.S. PATENT DOCUMENTS

| 5,589,296 | A | * | 12/1996 | Iwamoto et al. .............. 429/322 |
| 6,066,417 | A | * | 5/2000 | Cho et al. ...................... 429/303 |
| 6,365,300 | B1 | | 4/2002 | Ota et al. |
| 6,444,369 | B1 | * | 9/2002 | Kamino et al. ............... 429/303 |
| 2004/0126667 | A1 | * | 7/2004 | Sandi-Tapia et al. ......... 429/317 |
| 2006/0147806 | A1 | | 7/2006 | Kugai et al. |
| 2009/0068563 | A1 | | 3/2009 | Kanda et al. |
| 2010/0151335 | A1 | | 6/2010 | Senga et al. |
| 2010/0248032 | A1 | | 9/2010 | Pitteloud et al. |

(Continued)

FOREIGN PATENT DOCUMENTS

| JP | 2000-340257 A | 12/2000 |
| JP | 2009-152077 | 7/2009 |

(Continued)

OTHER PUBLICATIONS

Korean Patent Abstracts No. 10-194549 B for KR 10-0898706 (2 pages).

(Continued)

*Primary Examiner* — Mark F Huff
*Assistant Examiner* — Monique Wills
(74) *Attorney, Agent, or Firm* — Christie, Parker & Hale, LLP (57) ABSTRACT

A solid electrolyte includes a sulfide-based electrolyte and a coating film including a water-resistant, lithium conductive polymer on a surface of the sulfide-based electrolyte, a method of preparing the solid electrolyte, and a lithium battery including the solid electrolyte.

10 Claims, 3 Drawing Sheets

(56) References Cited

U.S. PATENT DOCUMENTS

| | | |
|---|---|---|
| 2010/0279176 A1 | 11/2010 | Ogawa et al. |
| 2011/0020704 A1 | 1/2011 | Fukuchi et al. |
| 2011/0027656 A1* | 2/2011 | Chiang et al. ............ 429/246 |

FOREIGN PATENT DOCUMENTS

| | | |
|---|---|---|
| JP | 2010-033732 | 2/2010 |
| JP | 2010-033875 A | 2/2010 |
| JP | 2010-033876 | 2/2010 |
| KR | 2003-0087180 A | 11/2003 |
| KR | 10-0898706 B1 | 2/2008 |
| KR | 10-2008-0041627 A | 5/2008 |
| KR | 10-2009-0027144 | 3/2009 |
| KR | 10-0898706 | 5/2009 |
| KR | 10-2010-0049556 A | 5/2010 |
| KR | 10-2010-0057678 A | 5/2010 |
| KR | 10-2010-0084638 A | 7/2010 |

OTHER PUBLICATIONS

Machine English Translation of JP 2010-033875 A (37 pages).
KIPO Office action dated Feb. 28, 2013, for Korean priority Patent application 10-2011-0060805, (6pages).
Patent Abstracts of Japan, and English machine translation of Japanese Publication 2010-033876 listed above, (19 pages).
KIPO Notice of Allowance dated Aug. 21, 2014, for Korean priority Patent application 10-2011-0060805, (6 pages).
Patent Abstracts of Japan, and English machine translation of Japanese Publication 2009-152077 dated Jul. 9, 2009, (16 pages).
Patent Abstracts of Japan, and English machine translation of Japanese Publication 2010-033732 dated Feb. 12, 2010, (29 pages).

* cited by examiner

SOLID ELECTROLYTE, METHOD OF PREPARING THE SAME, AND LITHIUM BATTERY CONTAINING THE SOLID ELECTROLYTE

CROSS-REFERENCE TO RELATED APPLICATION

This application claims priority to and the benefit of Korean Patent Application No. 10-2011-0060805, filed in the Korean Intellectual Property Office on Jun. 22, 2011, the entire content of which is incorporated herein by reference.

BACKGROUND

1. Field

One or more embodiments of the present invention relate to solid electrolytes, methods of preparing the solid electrolytes, and lithium batteries including the solid electrolytes.

2. Description of Related Art

Recently, the rapid proliferation of information related devices and communication devices, including personal computers (PCs), video cameras, and mobile phones, has led to more attention to develop batteries for use as a power source. Also, in the vehicle industry, high performance and high capacity batteries are being developed for use in electric vehicles and hybrid vehicles. Among various currently available batteries, lithium batteries are getting attention due to their high energy density.

When a liquid electrolyte using a combustible organic solvent is used as an electrolyte for a lithium battery, improvements regarding suppressing temperature increase during short circuiting and for preventing short circuiting are desired.

To address these short circuiting issues, a solid electrolyte type lithium battery using a solid electrolyte instead of a liquid electrolyte may be used. If a solid electrolyte is used, the safety of the battery may be improved because a combustible organic solvent is not used in the lithium battery (or is used in relatively limited quantities) and the manufacturing costs are reduced, thus increasing productivity. Sulfide-based solid electrolytes are often used as solid electrolytes in solid electrolyte type lithium batteries.

SUMMARY

Aspects of embodiments of the present invention are directed toward solid electrolytes having improved conductivity and low water sensitivity.

Aspects of embodiments of the present invention are directed toward methods of preparing the solid electrolytes.

Aspects of embodiments of the present invention are directed toward lithium batteries including the solid electrolyte.

According to one or more embodiments of the present invention, a solid electrolyte includes a sulfide-based electrolyte; and a coating film including a water-resistant, lithium conductive polymer on the sulfide-based electrolyte.

The water-resistant, lithium conductive polymer may include at least one of polyethylene oxide, polyethylene glycol, polypropylene oxide, polymethyl methacrylate, polydimethylsiloxane, polyvinylpyrrolidone, or polyacrylonitrile.

The water-resistant, lithium conductive polymer may be present at about 0.5 to about 10 parts by weight based on 100 parts by weight of the sulfide-based electrolyte.

The sulfide-based electrolyte may include at least one of $Li_2S-P_2S_5$, $Li_2S-B_2S_3$, $Li_2S-Si_2S_3$, $Li_2S-SiS_2$, $LiI-Li_2S-B_2S_3$, or $LiI-Li_2S-SiS_2$.

The contact angle of a surface of the solid electrolyte may be about 90° to about 120°.

The coating film may have a thickness of about 5 to about 50 nm.

The weight average molecular weight of the water-resistant, lithium conductive polymer may be about 5,000 to about 8,000,000 g/mol.

The sulfide-based electrolyte may be $Li_2S-P_2S_5$ and the coating film may be polyethylene oxide. The $Li_2S-P_2S_5$ may have a $Li_2S$ to $P_2S_5$ molar ratio of 1:9 to 9:1.

According to one or more embodiments of the present invention, a method of preparing a solid electrolyte includes preparing a water-resistant, lithium conductive polymer solution by dissolving a water-resistant, lithium conductive polymer in a solvent; immersing a sulfide-based core polymer in the water-resistant, lithium conductive polymer solution to form a mixture; stirring the mixture; and drying the mixture to form a solid electrolyte.

The solvent may be included at about 1 to about 50 parts by weight based on 100 parts by weight of the water-resistant, lithium conductive polymer.

The water-resistant, lithium conductive polymer may be included at about 0.5 to about 10 parts by weight based on 100 parts by weight of the sulfide-based polymer.

The drying the mixture may include drying the mixture at about 30 to about 70° C.

According to one or more embodiments of the present invention, a lithium battery includes the solid electrolyte.

BRIEF DESCRIPTION OF THE DRAWINGS

These and/or other aspects of the embodiments of the present invention will become apparent and more readily appreciated from the following description in conjunction with the accompanying drawings, in which.

DETAILED DESCRIPTION

Embodiments of the present invention will now be described in more detail, examples of which are illustrated in the accompanying drawings, wherein like reference numerals refer to the like elements throughout. The present embodiments may have different forms and should not be construed as being limited to the descriptions set forth herein. Accordingly, the embodiments are described below by referring to the figures, merely to explain aspects of the present description.

Hereinafter, solid electrolytes, methods of preparing solid electrolytes, and lithium batteries including solid electrolytes, according to one or more embodiments of the present invention, will be described in detail.

A solid electrolyte according to an embodiment of the present invention includes a sulfide-based electrolyte (e.g., a sulfide-based electrolyte core) and a coating film including a water-resistant, lithium conductive polymer formed on (e.g., on a surface of) the sulfide-based electrolyte. In embodiments of the present invention, the water-resistant lithium conductive polymer completely coats the surface of the sulfide-based electrolyte.

The water-resistant, lithium conductive polymer is resistant (or repellant) to water while having lithium conductivity. If the water-resistant, lithium conductive polymer is coated on the sulfide-based electrolyte, proton conductivity of the sulfide-based electrolyte may be improved and water sensitivity of the sulfide-based electrolyte may be reduced. Preparation of the electrolyte may be more efficiently performed because it is less sensitive to water.

Non-limiting examples of the water-resistant, lithium conductive polymer include polyethylene oxide, polyethylene glycol, polypropylene oxide, polymethyl methacrylate, polydimethylsiloxane, polyvinylpyrrolidone, polyacrylonitrile, or mixtures thereof.

The weight average molecular weight of the water-resistant, lithium conductive polymer may be about 5,000 to about 8,000,000 g/mol. In some embodiments, the weight average molecular weight of the water-resistant, lithium conductive polymer may be about 50,000 to about 500,000 g/mol. For example, the weight average molecular weight of the water-resistant, lithium conductive polymer may be about 100,000 g/mol. In one embodiment, If the weight average molecular weight of the water-resistant, lithium conductive polymer is within the ranges described above, the coating film is easily and uniformly formed on the sulfide-based electrolyte.

The water-resistant, lithium conductive polymer may be included at about 0.5 to about 10 parts by weight based on 100 parts by weight of the sulfide-based electrolyte. In some embodiments, the water-resistant, lithium conductive polymer may be included at about 7 parts by weight based on 100 parts by weight of the sulfide-based electrolyte. In one embodiment, if the water-resistant, lithium conductive polymer is included within the weight ranges described above, the solid electrolyte has desired or minimal water sensitivity and improved proton conductivity.

Any one of various sulfide-based solid electrolytes that are used in lithium batteries may be used as the sulfide-based electrolyte. Non-limiting examples of suitable sulfide-based electrolytes include $Li_2S$—$P_2S_5$, $Li_2S$—$B_2S_3$, $Li_2S$—$Si_2S_3$, $Li_2S$—$SiS_2$, $LiI$—$Li_2S$—$B_2S_3$, $LiI$—$Li_2S$—$SiS_2$, or mixtures thereof.

The sulfide-based electrolyte may be prepared by heat treating a sulfide glass containing, for example, lithium, phosphorous, sulfur, and/or boron. The sulfide-based electrolyte may be prepared and purified by using a method disclosed in, for example, WO 2007/066539, the entire content of which is incorporated herein by reference.

The contact angle of the solid electrolyte (measured by using a contact angle measuring instrument) may be about 90° to about 120°. In some embodiments, the contact angle of the solid electrolyte is about 105° to about 111°. For example, the contact angle of the solid electrolyte may be about 110.5°. In one embodiment, if the contact angle is within the ranges described above, water sensitivity of the solid electrolyte is low.

The thickness of the coating film included in the solid electrolyte may be about 5 to about 50 nm. In some embodiments, the thickness of the coating film on the sulfide-based electrolyte may be about 8 to about 12 nm. For example, the thickness of the coating film may be about 10 nm. In one embodiment, if the thickness of the coating film is within the ranges described above, the solid electrolyte has relatively low water sensitivity without a decrease in conductivity.

According to an embodiment of the present invention, a solid electrolyte includes a $Li_2S:P_2S_5$ electrolyte, and a coating film including polyethylene oxide formed on a surface of the $Li_2S$—$P_2S_5$ electrolyte. In the $Li_2S$—$P_2S_5$ electrolyte, a molar ratio of $Li_2S$ to $P_2S_5$ may be about 1:9 to about 9:1. In some embodiments, the molar ratio of $Li_2S$ to $P_2S_5$ may be about 7:3.

A method of preparing the solid electrolyte, according to an embodiment of the present invention, will now be described in more detail.

First, a water-resistant, lithium conductive polymer is dissolved in a solvent to prepare a water-resistant, lithium conductive polymer solution. The solvent may be included at about 1 to about 50 parts by weight based on 100 parts by weight of the water-resistant lithium conductive polymer. In one embodiment, if the amount of the solvent is within the range described above, the coating film is uniformly formed on the surface of the sulfide-based electrolyte.

As the solvent, any one of various materials that dissolve a durable proton conductive polymer may be used. Non-limiting examples of suitable solvents include acetonitrile, tetrahydrofuran, acetone, etc.

Then, a sulfide-based polymer is immersed in the water-resistant, lithium conductive polymer solution, followed by stirring and drying.

The drying may be performed at a temperature of about 30 to about 70° C. In one embodiment, if the drying temperature is within the range described above, an electrolyte having low water sensitivity and high proton conductivity is obtained.

An amount of the water-resistant, lithium conductive polymer may be about 0.5 to about 10 parts by weight based on 100 parts by weight of the sulfide-based polymer. In one embodiment, if the amount of the water-resistant, lithium conductive polymer is within the range described above, a solid electrolyte having reduced water sensitivity is obtained without a decrease in proton conductivity.

The solid electrolyte prepared as described above according to an embodiment of the present invention may be a non-combustible or non-flammable inorganic solid that has a decomposition voltage of at least 5 V or more and a high proton conductivity of $10^{-4}$ S/cm or more at room temperature (20-25° C.). Accordingly, the solid electrolyte according to embodiments of the present invention is suitable for use in a lithium battery, and is highly water-resistant.

The solid electrolyte may be assembled with a positive active material and a negative active material to manufacture a secondary lithium battery.

A lithium battery including the solid electrolyte, according to an embodiment of the present invention, will be described in more detail.

First, a positive active material, a conductive material, a binder, and a solvent are mixed to prepare a positive active material composition.

The positive active material may be a sulfide-based material, an oxide-based material, or niobium selenide ($NbSe_3$). Non-limiting examples of the sulfide-based material include titanium sulfide ($TiS_2$), molybdenum sulfide ($MoS_2$), iron sulfide (FeS or $FeS_2$), copper sulfide (CuS), or nickel sulfide ($Ni_3S_2$). Non-limiting examples of the oxide-based material include bismuth oxide ($Bi_2O_3$), bismuth lead oxide ($Bi_2Pb_2O_5$), copper oxide (CuO), vanadium oxide ($V_6O_{13}$), lithium cobalt oxide ($LiCoO_2$), lithium nickel oxide ($LiNiO_2$), lithium manganese oxide ($LiMnO_2$), etc.

A positive electrode may be manufactured by molding the positive active material composition including a positive active material, a binder, etc. in a set shape. Alternatively, a positive electrode may be manufactured by coating the positive active material composition on a current collector, such as a copper foil or an aluminum foil.

In detail, the positive active material composition including a positive active material, a conductive material, a binder, and a solvent is prepared. The positive active material composition may then be directly coated on a metallic current collector to prepare a positive electrode plate. Alternatively, the positive active material composition may be cast on a separate support, and then a positive active material film may be separated from the support and laminated on a metallic current collector to prepare a positive electrode plate. However, the positive electrode preparation method is not limited thereto.

As the conductive material, carbon black or graphite particles may be used. Non-limiting examples of suitable conductive materials include graphite, such as natural or artificial graphite; carbon black, such as carbon black, acetylene black, Ketjen black, channel black, furnace black, lamp black, or thermal black; conductive fibers, such as carbon fibers or metallic fibers; metallic powders, such as carbon fluoride powder, aluminum powder, or nickel powder; conductive whiskers, such as zinc oxide or potassium titanate; conductive metal oxides, such as titanium oxide; or polyphenylene derivatives.

Non-limiting examples of the binder include a vinylidene fluoride/hexafluoropropylene copolymer; polyvinylidenefluoride (PVdF); polyacrylonitrile, polymethylmethacrylate, polytetrafluoroethylene, or mixtures thereof; or styrene butadiene rubber-based polymers. However, any suitable binder may be used.

Non-limiting examples of the solvent include N-methylpyrrolidone, acetone, water, etc. However, any suitable solvent may be used.

The positive active material, the conductive material, the binder, and the solvent may be used at the same amounts/ratios as conventionally used in a lithium battery. If desired, and if structurally beneficial for a particular lithium battery, one or more of the conductive material, the binder, and the solvent may be omitted.

Then, a negative active material, a conductive material, a binder, and a solvent are mixed to prepare a negative active material composition. The negative active material composition may be directly coated and dried on a metallic current collector to form a negative electrode plate. Alternatively, the negative active material composition may be cast on a separate support, and then a negative active material composition film may be separated from the support and laminated on a metallic current collector to form a negative electrode plate.

The negative active material may not be particularly limited, and may be one that is suitably used in the art. Non-limiting examples of suitable negative active materials include lithium metal, a metal that is alloyable with lithium, a transition metal oxide, a transition metal compound, a material that is able to be doped and undoped with lithium, a material that enables reversible intercalation and deintercalation of lithium ions, or a conductive polymer.

Non-limiting examples of the transition metal oxide include a tungsten oxide, a molybdenum oxide, a titanium oxide, a lithium titanium oxide, a vanadium oxide, or a lithium vanadium oxide. Non-limiting examples of the transition metal compound include a Group I metallic compound, such as $CuO$, $Cu_2O$, $Ag_2O$, $CuS$, or $CuSO_4$; a Group IV metallic compound, such as $TiS_2$ or $SnO$; a Group V metallic compound, such as $V_2O_6$, $V_6O_{12}$, $VO_x$ ($0<x<6$), $Nb_2O_5$, $Bi_2O_3$, or $Sb_2O_3$; a Group VI metallic compound, such as $CrO_3$, $Cr_2O_3$, $MoO_3$, $MoS_2$, $WO_3$, or $SeO_2$; a Group VII metallic compound, such as $MnO_2$ or $Mn_2O_3$; a Group VIII metallic compound, such as $Fe_2O_3$, $FeO$, $Fe_3O_4$, $Ni_2O_3$, $NiO$, $CoO_3$, or $CoO$; or a compound represented by $Li_xMN_yX_2$ (where M and N are each independently a Group I to VIII metal, X is oxygen or sulfur, $0.1 \leq x \leq 2$, and $0 \leq y \leq 1$), for example, lithium titanate, such as, $Li_yTiO_2$ ($0 \leq y \leq 1$), $Li_{4+y}Ti_6O_{12}$ ($0 \leq y \leq 1$), or $Li_{4+y}Ti_{11}O_{20}$ ($0 \leq y \leq 1$).

Non-limiting examples of the material that is able to be doped and undoped with lithium include silicon (Si), SiOx ($0<x<2$), a Si—Y alloy (where Y is not Si and may be an alkali metal, an alkali earth metal, a Group 13 element, a Group 14 element, a transition metal, a rare-earth element, or combinations thereof), Sn, $SnO_2$, Sn—Y (where Y is not Si and may be an alkali metal, an alkali earth metal, a Group 13 element, a Group 14 element, a transition metal, a rare-earth element, or combinations thereof), or $SiO_2$. The material that is able to be doped and undoped with lithium may be and at least one of these may be used in combination with $SiO_2$. Y may be, for example, magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

The material that enables reversible intercalation and deintercalation of lithium ions may be any one of various carbonaceous negative active materials that are suitably used in a lithium battery. Non-limiting examples of the material that enables reversible intercalation and deintercalation of lithium ions include crystalloid carbon, amorphous carbon, or mixtures thereof. Non-limiting examples of crystalloid carbon include amorphous, plate, flake, spherical, or fiber-type natural graphite or artificial graphite. Non-limiting examples of amorphous carbon include soft carbon (e.g., low-temperature calcined carbon), hard carbon, mesophase pitch carbide, or calcined coke.

Non-limiting examples of the conductive polymer include disulfide, polypyrrole, polyaniline, polyparaphenylene, polyacetylene, or polyacene.

The conductive material, the binder, and the solvent included in the negative active material composition may be the same as in the positive active material composition. Also, a plasticizer may be added to the positive active material composition and/or negative active material composition to form pores in the corresponding electrode.

The negative active material, the conductive material, the binder, and the solvent may be used at the same amounts/ratios as are suitably used in a lithium battery. If desired, and if structurally beneficial for a particular lithium battery, one or more of the conductive material, the binder, and the solvent may be omitted.

Then, the solid electrolyte according to an embodiment of the present invention is interposed between the positive electrode and the negative electrode to form a battery assembly. The battery assembly is placed in a battery case, thereby completing the manufacture of a lithium battery.

A plurality of battery assemblies may be stacked on each other and connected in series to form a battery pack, and the battery pack may be used in devices that require high capacity and high performance. For example, a battery pack may be used in notebook computers, smart phones, electric tools, electric vehicles, etc.

The lithium battery according to embodiments of the present invention has good high temperature cyclic characteristics and high temperature stability. Due to these improved properties, the lithium battery is suitable for medium- or large-sized energy storage apparatuses. For example, the lithium battery is suitable for use in a portable information terminal, a portable electronic device, a household small electric power storage apparatus, an automatic motorcycle using a motor as a driving force, an electric vehicle, and a hybrid electric vehicle.

The lithium battery may further include a separator that is suitable for use in a lithium battery, in addition to the solid electrolyte. If the separator is used, short circuiting of a battery is less likely to occur.

Non-limiting examples of the separator include glass fiber, polyester, polyethylene, polypropylene, polytetrafluoroethylene (PTFE), or combinations thereof, and these separators may be in a non-woven or woven fabric form. For example, a separator suitable for a lithium ion battery may be a rollable separator formed of polyethylene or polypropylene.

The battery case may further contain, if desired, an organic electrolytic solution containing a lithium salt dissolved in an organic solvent. If an organic electrolytic solution is used, the conductivity of a battery may be improved. The organic electrolytic solution may be included at 20 parts by weight or less based on 100 parts by weight of the solid electrolyte. For example, the organic electrolytic solution may be included at about 1 to about 20 parts by weight based on 100 parts by weight of the solid electrolyte.

The organic solvent may be any one of various solvents that are conventionally used in a lithium battery. Non-limiting examples of the organic solvent include propylenecarbonate, ethylenecarbonate, fluoroethylenecarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofurane, 2-methyltetrahydrofurane, γ-butyrolactone, dioxirane, 4-methyldioxirane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, dimethylether, or mixtures thereof.

The lithium salt may be any one of various lithium salts used in the art. Non-limiting examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each individually a natural number), LiCl, LiI, or mixtures thereof.

One or more embodiments of the present invention will now be described in detail with reference to the following examples. However, the examples are not intended to limit the scope of the one or more embodiments of the present invention.

PREPARATION EXAMPLE 1

Preparation of Solid Electrolyte 10 g of polyethylene oxide was dissolved in 90 g of acetonitrile in a dry room to prepare a 10 wt % polyethylene oxide solution. The weight average molecular weight of polyethylene oxide was about 100,000 g/mol.

10 g of $Li_2S$—$P_2S$, having a molar ratio of 7:3, was added to the polyethylene oxide solution and stirred for about 6 hours. Then, the mixture was dried at a temperature of 60° C. under a vacuum for 24 hours, thereby preparing a solid electrolyte including a $Li_2S$—$P_2S$ electrolyte and a polyethylene oxide coating film formed on a surface of the $Li_2S$—$P_2S$ electrolyte.

The polyethylene oxide coating film was included in the solid electrolyte at about 5 parts by weight based on 100 parts by weight of the $Li_2S$—$P_2S$ electrolyte.

PREPARATION EXAMPLE 2

Preparation of Solid Electrolyte

A solid electrolyte was prepared in the same manner as in Preparation Example 1, except that polypropylene oxide was used instead of polyethylene oxide.

PREPARATION EXAMPLE 3

Preparation of Solid Electrolyte

A solid electrolyte was prepared in the same manner as in Preparation Example 1, except that an amount of the polyethylene oxide was 2 g.

The polyethylene oxide coating film was included in the solid electrolyte at about 1 part by weight based on 100 parts by weight of the $Li_2S$—$P_2S$ electrolyte.

PREPARATION EXAMPLE 4

Preparation of Solid Electrolyte

A solid electrolyte was prepared in the same manner as in Preparation Example 1, except that $Li_2S$—$B_2S_3$, having a molar ratio of 7:3, was used instead of $Li_2S$—$P_2S$, having a molar ratio of 7:3.

PREPARATION EXAMPLE 5

Preparation of Solid Electrolyte

A solid electrolyte was prepared in the same manner as in Preparation Example 1, except that polymethyl methacrylate was used instead of polyethylene oxide.

PREPARATION EXAMPLE 6

Preparation of Solid Electrolyte

A solid electrolyte was prepared in the same manner as in Preparation Example 1, except that polydimethylsiloxane was used instead of polyethylene oxide.

PREPARATION EXAMPLE 7

Preparation of Solid Electrolyte

A solid electrolyte was prepared in the same manner as in Preparation Example 1, except that polyacrylonitrile was used instead of polyethylene oxide.

EXAMPLE 1

Manufacture of Lithium Battery $LiCoO_2$ as a positive active material, acetylene black as a conductive material, and polyvinylidenefluoride (PVdF) as a binder were mixed at a weight ratio of 92:4:4 to prepare a positive active material slurry.

The positive active material slurry was uniformly applied on an aluminum foil, and then dried at a temperature of 110° C., and then roll-pressured, to prepare a positive electrode plate.

The solid electrolyte prepared according to Preparation Example 1 was placed between the prepared positive electrode plate and an opposite electrode (i.e., a negative electrode) including lithium metal. An electrolytic solution in which 1.3 M $LiPF_6$ was dissolved in a mixed solvent including ethylene carbonate, ethylmethyl carbonate, and dimethyl carbonate at a volumetric ratio of 3:4:3 was then injected thereto to manufacture a 2032-standard coin cell according to a conventional manufacturing process for a lithium battery.

EXAMPLES 2 TO 7

Manufacture of Lithium Batteries

Coin cells were manufactured in the same manner as in Example 1, except that each of the solid electrolytes prepared according to Preparation Examples 2 to 7, respectively, was used instead of the solid electrolyte prepared according to Preparation Example 1.

COMPARATIVE EXAMPLE 1

Manufacture of Lithium Battery

A coin cell was manufactured in the same manner as in Example 1, except that a polyethylene oxide coating film was not formed on a surface of the $Li_2S$—$P_2S$ electrolyte.

When a lithium battery was manufactured according to Comparative Example 1, due to the water sensitivity of the $Li_2S$:$P_2S$ solid electrolyte, the lithium battery was manufactured in a water-controlled location, for example, a glove box. However, since the solid electrolytes prepared according to Examples 1-3 have reduced sensitivity to water, the water control was not difficult, and thus the batteries could be manufactured in a Dry room.

EVALUATION EXAMPLE 1

Evaluation with Transmission Electron Microscope

Figure 1:
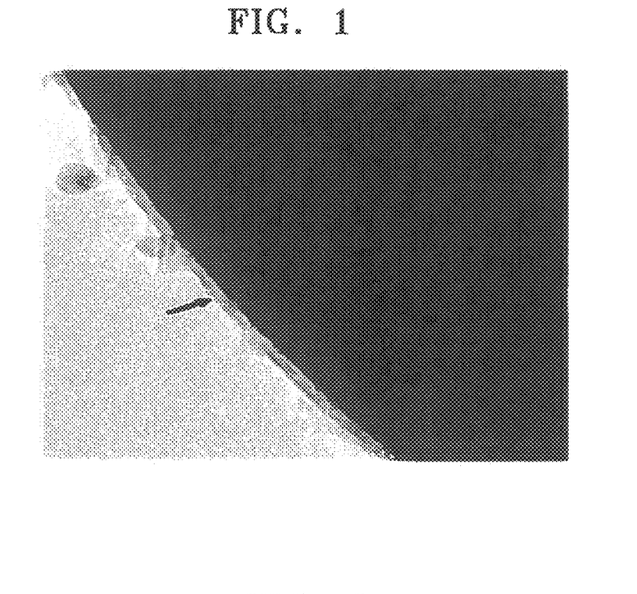
FIG. 1 is a transmission electron microscopic image of a solid electrolyte prepared according to Preparation Example 1.

The solid electrolyte prepared according to Preparation Example 1 was analyzed by transmission electron microscopy, and results thereof are shown in FIG. 1.

Referring to FIG. 1, it was confirmed that the coating film was present at a surface of the sulfide-based electrolyte. The thickness of the polyethylene oxide coating film was about 10 nm.

EVALUATION EXAMPLE 2

Measurement of Contact Angles

Figure 2:
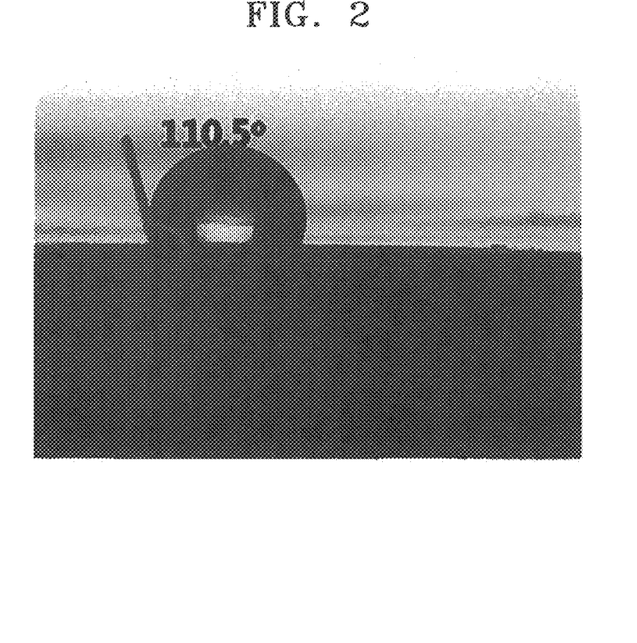
FIG. 2 shows the contact angle of a solid electrolyte prepared according to Preparation Example 1.
Figure 3:
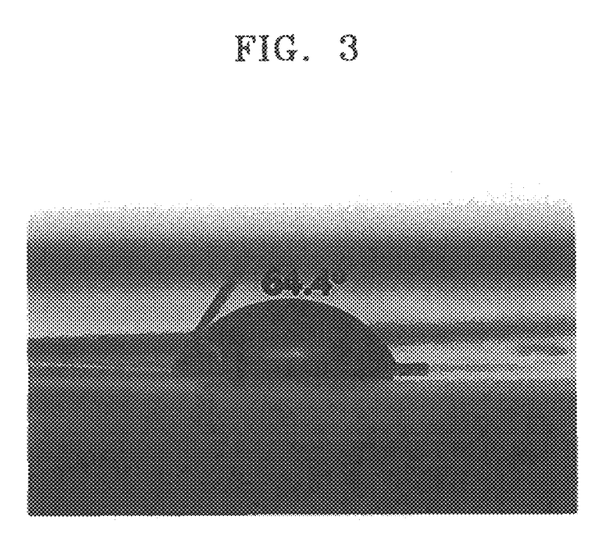
FIG. 3 shows the contact angle of Comparative Example 1.

Contact angles of the solid electrolyte prepared according to Preparation Example 1 and the solid electrolyte prepared according to Comparative Example 1 were measured by using a contact angle measuring instrument (a digital surface drop shape analysis system (DSA100)) and results thereof are shown in Table 1 below and FIGS. 2 and 3.

Each of the solid electrolyte prepared according to Preparation Example 1 and the solid electrolyte prepared according to Comparative Example 1 was dissolved in acetonitrile and each resultant solution was applied and dried on a glass plate, thereby forming a film. At a temperature of 25° C., a non-aqueous electrolytic solution was dropped on each electrolyte, and after 15 seconds, a contact angle between the liquid droplet and the film was measured using a microscope.

TABLE 1

|  | Contact angle (°) |
|---|---|
| Solid electrolyte prepared according to Preparation Example 1 | 110.5 |
| Solid electrolyte prepared according to Comparative Example 1 | 64.4 |

As shown in Table 1, the contact angle of the solid electrolyte prepared according to Preparation Example 1 is higher than that of the solid electrolyte prepared according to Comparative Example 1. From these results, it was confirmed that the solid electrolyte prepared according to Preparation Example 1 has lower water sensitivity than the solid electrolyte prepared according to Comparative Example 1.

EVALUATION EXAMPLE 3

Measurement of Proton Conductivity

Ionic conductivities of the solid electrolytes prepared according to Preparation Examples 1-7 and the solid electrolyte prepared according to Comparative Example 1 were measured by alternative current impedance spectroscopy (at a measurement frequency of 100 Hz-15 MHz). The results of Preparation Example 1 and Comparative Example 1 are shown in Table 2, below.

TABLE 2

|  | Ionic conductivity (S/cm) |
|---|---|
| Solid electrolyte prepared according to Preparation Example 1 | $9 \times 10^{-4}$ |
| Solid electrolyte prepared according to Comparative Example 1 | $5 \times 10^{-4}$ |

From results shown in Table 2, it was confirmed that due to the formation of the coating film, the solid electrolyte prepared according to Preparation Example 1 showed higher ionic conductivity than the solid electrolyte prepared according to Comparative Example 1.

The solid electrolytes prepared according to Preparation Examples 2 to 7 showed similar ionic conductivity characteristics to that of the solid electrolyte prepared according to Preparation Example 1.

EVALUATION EXAMPLE 4

High-Rate Charge and Discharge Test

Figure 4:
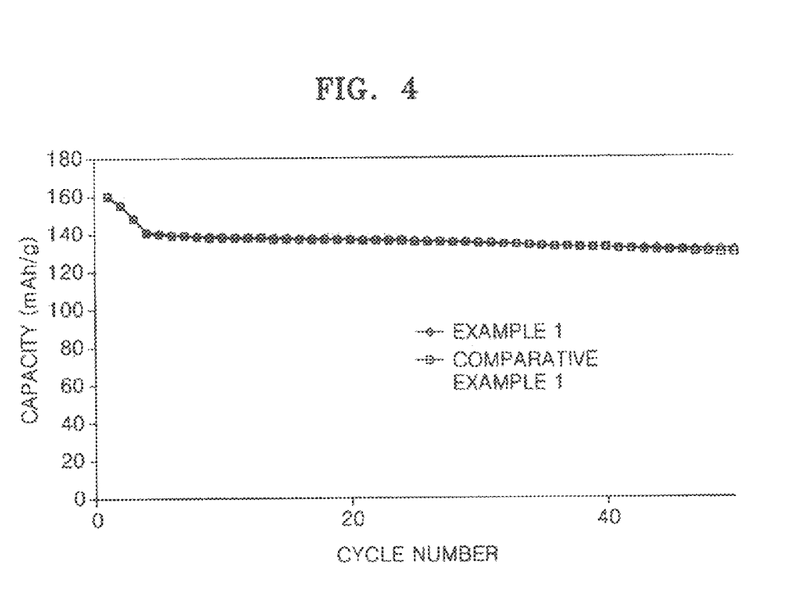
FIG. 4 is a graph showing lifetime characteristics of lithium batteries manufactured according to Example 1 and Comparative Example 1.

The coin cells manufactured according to Example 1 and Comparative Example 1 were charged and discharged with a constant current at a 1 C rate within a voltage range of about 3.0 to about 4.3 V (with respect to a lithium metal at room temperature) up to 50 cycles so as to measure a discharge capacity, and the results thereof are shown in FIG. 4.

Referring to FIG. 4, the coin cell manufactured according to Example 1 showed an equivalent level of capacity characteristics to that of Comparative Example 1.

As described above, the solid electrolytes according to the one or more of the above embodiments of the present invention have good conductivity and are easily prepared due to their reduced sensitivity to water. Furthermore, lithium batteries including the solid electrolytes according to embodiments of the present invention have improved lifetime characteristics.

It should be understood that the exemplary embodiments described herein should be considered in a descriptive sense only and not for purposes of limitation, and, on the contrary, this disclosure is intended to cover various modifications and equivalent arrangements included within the spirit and scope of the appended claims and equivalents thereof. Descriptions of features or aspects within each embodiment should typically be considered as available for other similar features or aspects in other embodiments.

What is claimed is:

1. A solid electrolyte comprising:
   a sulfide-based electrolyte; and
   a coating film comprising a water-resistant, lithium conductive polymer on the sulfide-based electrolyte,
   wherein the water-resistant, lithium conductive polymer comprises at least one selected from the group consisting of polyethylene oxide, polyethylene glycol, polypropylene oxide, polymethyl methacrylate, polydimethylsiloxane, polyvinylpyrrolidone, and polyacrylonitrile, and the coating film has a thickness of about 8 to about 12 nm, wherein the water-resistant, lithium conductive polymer is present at about 1 to about 5 parts by weight based on 100 parts by weight of the sulfide-based electrolyte, and the contact angle of a surface of the solid electrolyte is about 90° to about 120°.

2. The solid electrolyte of claim 1, wherein the sulfide-based electrolyte comprises at least one selected from the group consisting of $Li_2S$—$P_2S_5$, $Li_2S$—$B_2S_3$, $Li_2S$—$Si_2S_3$, $Li_2S$—$SiS_2$, $LiI$—$Li_2S$—$B_2S_3$, and $LiI$—$Li_2S$—$SiS_2$.

3. The solid electrolyte of claim 1, wherein the weight average molecular weight of the water-resistant, lithium conductive polymer is about 5,000 to about 8,000,000 g/mol.

4. The solid electrolyte of claim 1, wherein the sulfide-based electrolyte comprises $Li_2S$—$P_2S_5$ and the coating film comprises polyethylene oxide.

5. The solid electrolyte of claim 4, wherein the $Li_2S$—$P_2S_5$ has a $Li_2S$ to $P_2S_5$ molar ratio of 1:9 to 9:1.

6. A method of preparing a solid electrolyte, the method comprising:

preparing a water-resistant, lithium conductive polymer solution by dissolving a water-resistant, lithium conductive polymer in a solvent; and
immersing a sulfide-based polymer in the water-resistant, lithium conductive polymer solution to form a mixture;
stirring the mixture; and
drying the mixture to form a solid electrolyte to comprise:
a sulfide-based electrolyte; and a coating film comprising the water-resistant, lithium conductive polymer on the sulfide-based electrolyte, wherein the water-resistant, lithium conductive polymer comprises at least one selected from the group consisting of polyethylene oxide, polyethylene glycol, polypropylene oxide, polymethyl methacrylate, polydimethylsiloxane, polyvinylpyrrolidone, and polyacrylonitrile, and the coating film has a thickness of about 8 to about 12 nm, wherein the water-resistant, lithium conductive polymer is present at about 1 to about 5 parts by weight based on 100 parts by weight of the sulfide-based electrolyte, and the contact angle of a surface of the solid electrolyte is about 90° to about 120°.

7. The method of claim 6, wherein the solvent is included at about 1 to about 50 parts by weight based on 100 parts by weight of the water-resistant, lithium conductive polymer.

8. The method of claim 6, wherein the drying the mixture comprises drying the mixture at about 30 to about 70° C.

9. A lithium battery comprising a solid electrolyte comprising: a sulfide-based electrolyte; and a coating film comprising a water-resistant, lithium conductive polymer on the sulfide-based electrolyte, wherein the water-resistant, lithium conductive polymer comprises at least one selected from the group consisting of polyethylene oxide, polyethylene glycol, polypropylene oxide, polymethyl methacrylate, polydimethylsiloxane, polyvinylpyrrolidone, and polyacrylonitrile, and the coating film has a thickness of 8 to about 12 nm, wherein the water-resistant, lithium conductive polymer is present at about 1 to about 5 parts by weight based on 100 parts by weight of the sulfide-based electrolyte, and the contact angle of a surface of the solid electrolyte is about 90° to about 120°.

10. The lithium battery of claim 9, wherein the sulfide-based electrolyte comprises at least one selected from the group consisting of $Li_2S$—$P_2S_5$, $Li_2S$—$B_2S_3$, $Li_2S$—$Si_2S_3$, $Li_2S$—$SiS_2$, $LiI$-$Li_2S$—$B_2S_3$, and $LiI$—$Li_2S$—$SiS_2$.

* * * * *